Sept. 13, 1966  H. P. RAABE  3,273,062
SYSTEM OF PROPAGATING RADIO ENERGY BY MEANS
OF ARTIFICIAL SCATTERERS
Filed Aug. 30, 1963  2 Sheets-Sheet 1

INVENTOR.
HERBERT P. RAABE
BY
Stuart R. Peterson
ATTORNEY

Sept. 13, 1966  H. P. RAABE  3,273,062
SYSTEM OF PROPAGATING RADIO ENERGY BY MEANS
OF ARTIFICIAL SCATTERERS
Filed Aug. 30, 1963  2 Sheets-Sheet 2
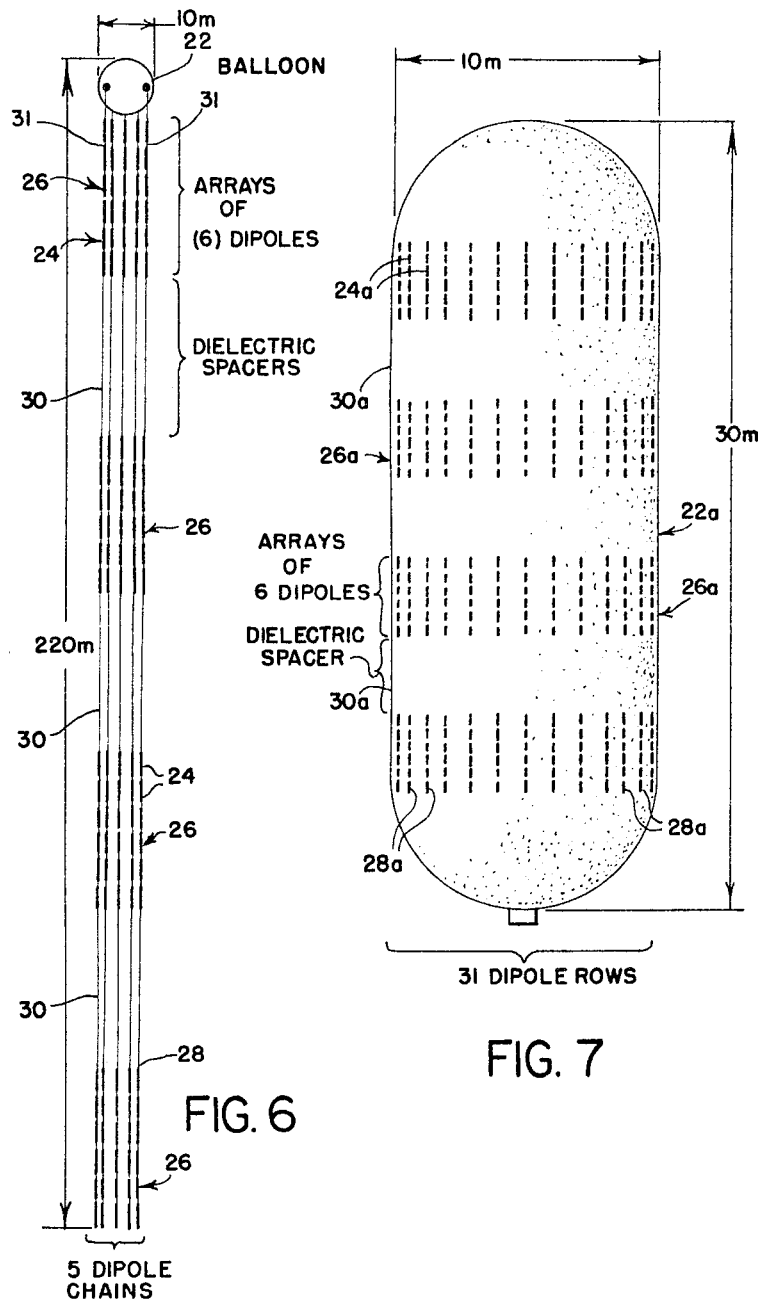
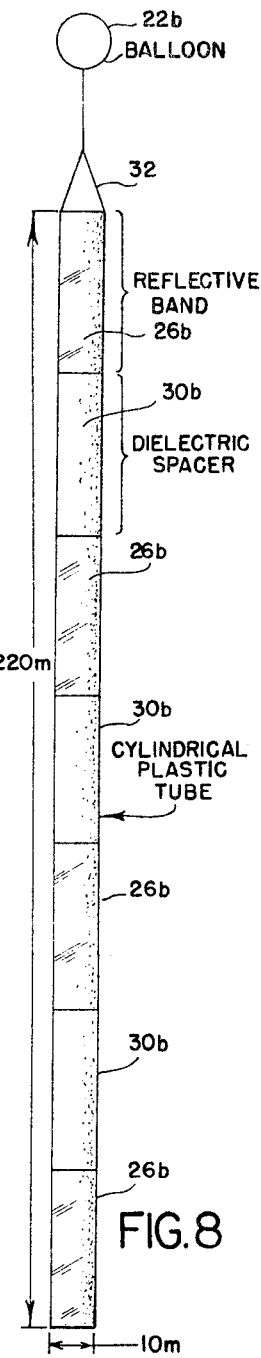
INVENTOR.
HERBERT P. RAABE
BY
Stuart R. Peterson
ATTORNEY

United States Patent Office 3,273,062
Patented Sept. 13, 1966

3,273,062
SYSTEM OF PROPAGATING RADIO ENERGY BY MEANS OF ARTIFICIAL SCATTERERS
Herbert P. Raabe, St. Paul, Minn., assignor, by mesne assignments, to Litton Systems, Inc., Beverly Hills, Calif., a corporation of Maryland
Filed Aug. 30, 1963, Ser. No. 305,683
1 Claim. (Cl. 325—14)

This invention relates generally to radio propagation, and pertains more particularly to a method or system of sending radio signals from one point on the earth's surface to another via artificial scatterers that are physically oriented in a uniform manner at an elevation above the earth.

It will be of course, recognized that radio propagation by means of natural scatterers is very common. In principle, any inhomogeneity of the propagation medium produces scattering effects. For example, tropospheric scatter communication makes use of the inhomogeneity of the refractive index of the atmosphere. If no natural scattering phenomena exists, artificial scatterers could be dispersed in the atmosphere or even in space.

Even the use of artificial scatterers is not new. Chaff, originally devised as an electromagnetic countermeasure against radar, has proven to be a useful scatterer for radio communication. For example, a plan has been proposed to disperse chaff in the form of tuned microwave dipoles in a space orbit around the earth, that is, beyond the earth's atmosphere, in order that these scatterers would be available for prolonged periods. Scatterers, which are dispersed in the atmosphere, though, will have an appreciably shorter lifetime because they drift away due to the effect of wind and gravity. It is largely because the cost of dispersing scatterers in the atmosphere is so much less than that entailed in putting such scatterers in orbit that dispersal of chaff in the atmosphere for communication has been seriously contemplated.

A characteristics of all scatter propagation systems known so far is the random distribution of phase and amplitude, the phase and amplitude differing from scattering element to scattering element. This leads to a very uniform distribution of the overall scattered power in various directions but carries with it a correspondingly low intensity level at the location of the receiver. In other words, much of the scattered radio energy is lost. In addition, a system of the type now under discussion would require dispersion of huge quantities of scatterers, quantities so great that the system would in most instances become unfeasible.

Accordingly, one object of the present invention is to provide a system of propagating radio energy through the use of artificial scatterers which will be considerably more efficient than those systems that have heretofore been suggested. More specifically, it is an aim of the present invention to arrange the individual scatterers so that their contribution to the scattered signal is not of a random nature but instead uniform in phase and amplitude.

Another object of the invention, which is in addition to increasing the effectiveness of the scatterers, is to provide a system of transmitting radio signals that will be virtually free of scintillations caused by variations in the arrangement of the scatterers. With the envisaged system, information can be transmitted at a higher rate than would otherwise be possible.

A further object of the invention is to provide a system of the foregoing character that can be practiced at a comparatively low cost. In this regard, it is an aim of the invention to provide a vehicle for the network of scatterers that can be in the form of a balloon capable of being easily launched. It is also planned that the individual scatterers, more specifically, scattering bands, will be either suspended from or printed on the surface of the balloon. Consequently, it should be apparent that conventional transmitting and receiving equipment can be utilized and that the only different apparatus required in the practicing of the invention resides in the use of appropriately disposed scattering bands which may assume several different lightweight configurations. The cost of a system of propagating radio energy becomes increasingly important when it is realized that in many instances the scattering bands will have to be replaced every few hours due to adverse weather conditions.

The above objects, and other objects of my invention will be made more apparent hereinafter, and are obtained by means of apparatus subsequently to be described and shown in the accompanying drawings, wherein:

FIGURE 6 depicts a balloon from which various groups or bands of dipoles are suspended;

FIGURE 7 pictures a different dipole configuration from that portrayed in FIGURE 6, the dipoles being in this instance applied directly to the outer surface of a generally cylindrical balloon, and FIGURE 8 depicts still another embodiment, this embodiment involving the disposition of metallic bands on a plastic tube suspended from a balloon.

Figure 1:
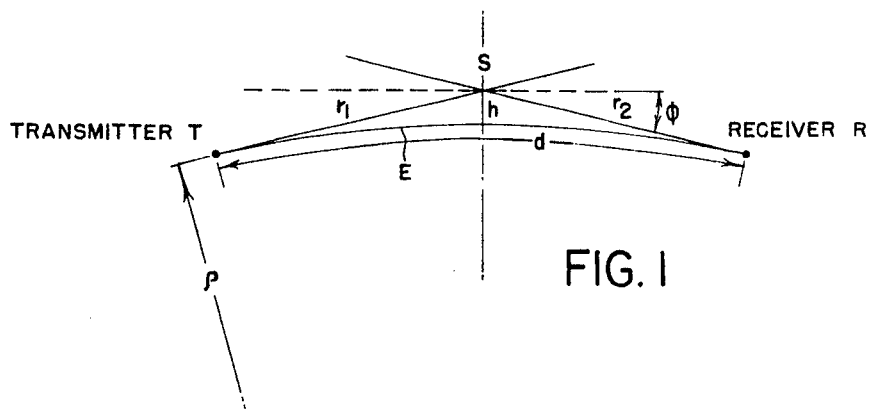
FIGURE 1 is a diagrammatic view of a transmitter and receiver that are spaced a considerable distance apart so that the use of airborne scatterers becomes necessary due to the curvature of the earth.

Referring now in detail to the drawings, the problem of transmitting radio signals from one point on the earth's surface to a distance point is best understood by an inspection of FIGURE 1. A radio transmitter T and a receiver R are located on the surface of the earth which has been labeled E. The distance $d$ is so great that no direct propagation can be achieved owing to the intervening curvature of the earth E. The discussion will be facilitated by visualizing two intersecting planes $r_1$, $r_2$ which are tangential to the earth's surface at the transmitter T and at the receiver R. The planes $r_1$, $r_2$ intersect at a terminal designated by the letter S which is at an elevation or height $h$ above the surface of the earth E.

It is above the terminal S in the earth's atmosphere that the present invention contemplates the location of scattering bands. These scatters, as will become apparent when describing FIGURES 6 and 7, can be of a resonating type, more particularly, tuned dipoles oriented parallel to the polarization vector which have the ability to scatter much more power than that intercepted by their geometric cross section, or they may be in the form of reflective metallic bands, as will become clearer hereinafter.

It can be further pointed out that each individual scatterer of a scattering cloud or network contributes to the signal arriving at the receiver R. If these individual scatters are all identical, the phase of the contributed signal is proportional to the total bistatic propagation path. Therefore, if all of the individual scatters were located on the surface of an ellipsoid, whose foci coincide with the locations of the communicating terminals, the resulting wave contributed to by the various scatters will be of the same phase.

Figure 2:
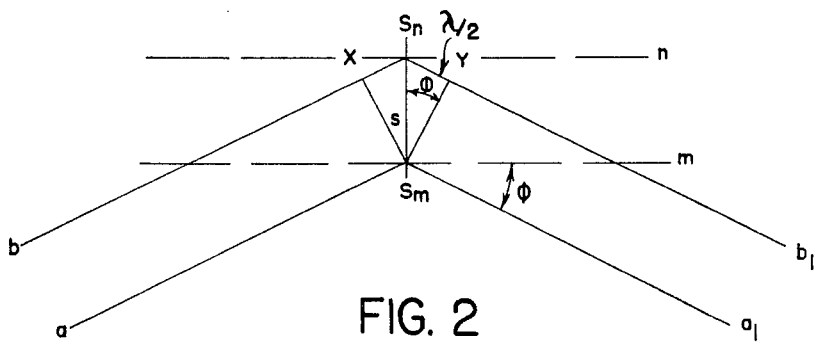
FIGURE 2 is a highly diagrammatic representation illustrating the need for phase shifting under some circumstances when practicing the present invention.

Phase shifts of whole numbers of wavelengths are of no consequence within a limited range. Accordingly, the individual scatters may also occupy concentric ellipsoids for which the total propagation path is delayed or advanced by corresponding amounts. It is not believed necessary to graphically show this, but it will be of assistance to make reference to FIGURE 2 which depicts two adjacent ellipsoidal surfaces $m$ and $n$ with the scatters being designated as $S_m$ and $S_n$. If the two propagation paths are considered to be $a-a_1$ and $b-b_1$ and that they differ by one wavelength $\lambda$ the distance $s$ between the scatters $S_m$ and $S_n$ should be $$s = \frac{\lambda}{2 \sin \phi}$$

It will be appreciated that it is not necessary to place the individual scatterers precisely on the surface of an ellipsoid to get a contribution from them. A slight deviation causes a phase shift of the scattered wave and the amplitude contribution drops off as the cosine of this phase shift. Therefore, a positive contribution can be expected from scatterers dispersed over a layer which is $s/2$ thick. As these layers can be repeated at spacings of $s$, a three-dimensional diffractive grating is formed by the scatterers which may occupy as much as 50 percent of the space.

While scatters may be of various forms, by far the lowest weight penalties are associated with resonating devices. With respect to effecting as much weight reduction along with a reducion in space, the simplest resonating device is in the form of a resonating shortcircuited dipole, more particularly, a half-wavelength dipole. While strictly speaking, a resonating device leaves no choice of frequency, there is a sufficient bandwidth in practice that can be utilized for any signal spectrum. Tuned dipoles can be modified to cause some phase shift to the scattered wave, and this effect can be employed for the purpose of providing more effective scatterers. Scatterers in the upper part of a network of such scatterers should advance the phase, whereas scatterers in the lower part should retard the phase to compensate for the different propagation lengths.

Figure 3:
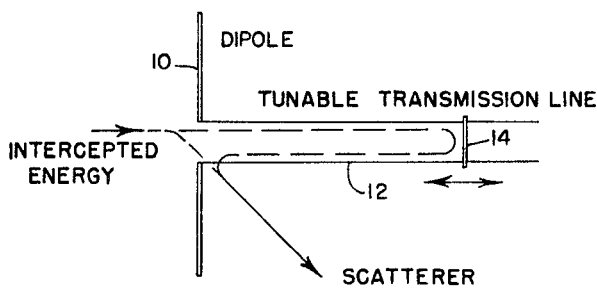
FIGURE 3 is a schematic diagram of one way in which the phase of the scattered wave may be shifted.

FIGURE 3 is intended to show one method by which the shift in phase of the scattered wave can be achieved. The dipole, which has been designated by the reference numeral 10, is matched to a transmission line 12 which can be shortcircuited over a variable range in the vicinity of a distance of $\lambda/2$ from the dipole. Such a dipole 10 intercepts a certain amount of energy due to its scattering cross section which is up to 0.5 $\lambda^2$ large. A portion of this energy is scattered immediately by the dipole 10, while the remaining portion travels down the transmission line 12 to the short circuit which has been indicated at 14, where it is reflected and transmitted as an in-phase addition to the immediately scattered wave, just as if there had been no transmission line at all. However, if the short circuit 14 is moved out of the $\lambda/2$ position, a forward or backward phase shift results for the reflected component and the entire contribution of the dipole to the scatter field is a phase shifted wave of lower amplitude.

Figure 4:
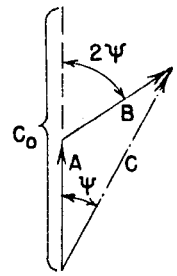
FIGURE 4 is a diagrammatic view that will be of assistance in understanding fully the action that takes place in the equipment shown in FIGURE 3.

As for graphically illustrating the above-mentioned effect, FIGURE 4 has been provided in which A is the phase of the immediately scattered wave and B that of the phase shifted wave. The resulting phase C is shifted by one-half of the phase angle of B and the amplitude is reduced by $\cos \psi$. Since no energy is lost, the balance of the intercepted energy is found in the wave field which travels straight through the scattering cloud, thereby corresponding to a small scattering cross section of the phase shifting dipole. Thus, the density of such dipoles can be made greater than that of resonating dipoles.

Figure 5:
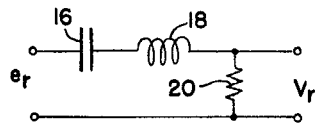
FIGURE 5 is an equivalent circuit of a dipole, such figure explaining the effect of the length of any single dipole.

As can be understood, various disadvantages are associated with the connecting of a dipole to a matched transmission line, and a more practical form of phase shifting would be derived via a one-half-wavelength dipole with the reactive load, either using a capacitance to advance the phase or an inductance to retard the phase. However, the most attractive arrangement for a number of reasons is a shortcircuited dipole whose length is varied. This is the preferred configuration and the reasons therefore should be readily apparent, especially when considered in conjunction with the following description. It will be of help, though, to consider the equivalent circuit of a dipole, and FIGURE 5 has been presented in order to explain the effect of such a dipole configuration. It will be perceived that the dipole consists of a series network of capacitance 16, inductance 18 and resistance 20. The intercepted energy generates an input voltage $e_r$ and the scattered wave is generated by the voltage $v_r$. The dipole is assumed to be free of loss, so that the value of resistance 20 represents the radiation resistance. In the case of resonance, the input and output will be identical. If the dipole is made longer, then the capacitance 16 and the inductance 18 increase, so that an inductance appears in series with the radiation resistance, thereby causing a retardation of the phase of the scattered wave. Consequently, longer dipoles should be placed below the resonating dipoles, and shorter dipoles should be placed in the upper part of the layer constituting the overall grouping of dipoles. Phase shifting scatterers, as herein mentioned, make the layer or band of such scatterers refractive in a manner similar to an optical prism. Phase shifts of $\pm 90$ degrees and more cannot be generated by this technique.

In order to disperse the various individual scatterers according to the above plan and to maintain their relative position, mechanical support for the individual scatterers is required. Such a support or vehicle will be referred to presently. It can be stated at this time, though, that two examples utilizing bands of tuned dipoles are herein described which have been computed for a propagation path over a distance of 1430 kilometers, this being the distance $d$ in FIGURE 1. The altitude of the scatterers should be at least 30 kilometers, and this is the height $h$ set forth in FIGURE 1. It has been found that the spacing between the various layers or bands, each layer or band including a group of individual dipoles, should be $6\lambda$ so that layers of $3\lambda$ thick could be occupied. In both examples a high altitude balloon was used as the vehicle, but in a different way in each instance.

Considering first the embodiment of FIGURE 6, a spherical balloon 22 has ben depicted as the vehicle from which a plurality of individual dipoles 24 are suspended. It has been assumed that a wavelength of 10 meters is to be utilized; hence, each shortcircuited dipole 24 is five meters long and up to six dipoles 24 can be stacked in one layer or band designated by the reference numeral 26. To get a reasonable field strength at the receiver R and under certain assumptions regarding the transmitter power and the gains of the antennas in the two terminals T and R, a total number of 120 dipoles 24 was found to be required. The arrangement of these dipoles 24 determines the shape of the forward scatter beam. However, other measurements, such as the diameter of the balloon 22, must be taken into account in actual practice.

From FIGURE 6, it can be seen that the dipoles 24 are arranged in a specific pattern or network involving the employment of five chains or rows labeled 28 of dipoles grouped so as to provide four layers or bands 26, each layer or band 26 including six dipoles. It will be observed that the various chains or rows 28 are suspended from the balloon 22 and that dielectric spacers 30 are provided in each chain between adjacent layers or bands 26, the various spacers 30 actually forming the bands 26 and being substantially the same length as each band is high. More specifically, the dipoles 24 can be in the form of metal wires or filaments with very short plastic threads 31, such as of nylon, tied therebetween. The spacers 30 can also constitute nylon threads, but of longer length, the length having already been mentioned. To accommodate the entire network, it is contemplated that the balloon 22 will have a diameter of 10 meters and that the chains 28 will be approximately 220 meters long. The spacers 30 will have a length of 3λ and the circumferential spacing of the various chains 28 will be one-half the wavelength and should be sufficient to give each chain its full share of illuminating power.

It will be appreciated from what has been presented above that the network described in connection with FIGURE 6 is intended for vertical polarization. The dipoles 24 can be easily oriented vertically by the aid of gravity after the balloon 22 has been launched and is floating in the earth's atmosphere by causing the longitudinal axes of the chains 28 to point toward the earth E. Thus, there is provided a vertical aperture of 210 meters in length and the corresponding beamwidth becomes about 2.7 degrees while the horizontal beam would cover at least 60 degrees so the receiver R can be reached over a wide geographical area. Thus, one simple and inexpensive balloon-borne scattering system would suffice to provide a communication link between ground stations spaced apart over a distance up to about 1430 kilometers depending on the altitude of the scatterers. As already alluded to, this being in contrast to other non-coherent scatter propagation systems, the present coherent system does not cause scintillation of the radio signal.

No attempt is herein made to present a system involving the optimum frequency for the system disclosed, especially since a number of operational factors would enter into the final design. However, FIGURE 6 has been described in considerable details and to give another example, attention is now directed to FIGURE 7.

In FIGURE 7, a substantially cylindrical balloon designated 22a has a diameter of 10 meters and a length of 30 meters. This particular system has been designed for a wavelength of one meter. Although the number of dipoles 24a is considerably greater than that for the 10 meter wavelength system shown in FIGURE 6, nonetheless they take up much less space and can be very easily printed, taped or otherwise applied to the surface of the cylindrical balloon 22a. Here again, as in the embodiment of FIGURE 6, there are four layers or bands identified by the reference numeral 26a, each layer or band 26a including 31 dipole chains or rows 28a. The number of dipoles in each chain 28a is six in the embodiment of FIGURE 7, this being the same number as set forth in FIGURE 6. Whereas, the dipoles 24 are each five meters long, the dipoles 24a in the present instance are 0.5 meter long. In this embodiment, the dipoles 24a can be printed or otherwise painted directly on the surface of the balloon 22a, which may be of ½ mil thick Mylar, the balloon surface itself providing the dielectric spacers 30a in this instance.

Since the dipoles contribute very little to the weight and cost of a system of the envisaged type, the smaller overall size of the balloon has a definite advantage because it not only reduces the amount of payload that must be placed in the atmosphere but the smaller overall balloon size permits a reduction in the cost of fabricating such a balloon.

Attention is now directed to FIGURE 8 where a third example or embodiment is pictured. In this instance, a spherical balloon 22b is utilized and through the agency of harness 32 a tubular plastic member 34, such as ½ mil thick Mylar, is suspended in the atmosphere. For the sake of simplicity, the tube 34 can be considered to have a length of 220 meters and a diameter of 10 meters, this being the approximate length of the chains 28 and the diameter of a circle about which they are placed in FIGURE 6. The reflective bands 26b shown in FIGURE 6, though, constitute uninterrupted or imperforated metallized areas in contradistinction to the individual depoles 24. The bands 26b, because of the assumed comparative conditions, will therefore have a length or height of 3λ and the dielectric spacers 30b, which are merely unmetallized areas of the surface of the plastic tube 34, will also have the same length or height, as mentioned when describing FIGURE 6.

It will be recognized that if the density of an array of individual dipoles becomes so large that practically all energy incident on the bands occupied by the dipoles is scattered, such dipole array becomes reflective like a continuous sheet of conductive material. Therefore, the same effect or result achieved with either the embodiment of FIGURE 6 or that of FIGURE 7 can be realized with the modification shown in FIGURE 8. Stated somewhat differently, the layers or bands 26 or 26a are made of continuous reflective material in FIGURE 8 and have been designated as such by the reference numeral 26b. The bands 26, 26a, 26b are all uniformly spaced in each embodiment and when located in the atmosphere at the elevation S or above intercept at least a portion of the radio energy being transmitted from the transmitter T and redirect at least some of the intercepted energy toward the receiver R. The arrangement illustrated in FIGURE 8, it can be noted, has worked well in actual practice.

The foregoing description is furnished by way of illustration and not of limitation, and it is therefore my intention that the invention be limited only by the appended claim or their equivalents wherein I have endeavored to claim broadly all inherent novelty.

What is claimed:

A system of propagating radio energy by means of artificial scatters, which comprises:

a generally cylindrical balloon oriented in space with its longitudinal axis pointed toward the earth so that one end thereof is higher than the other;

a network of dipoles supported by said balloon, said dipoles being of a length such as to be substantially tuned to a given frequency, said dipoles being grouped in longitudinally spaced layers with each layer containing a predetermined number of circumferentially spaced rows of dipoles, those of said dipoles farther from the earth in any given layer being longer and those dipoles nearer the earth being shorter than those dipoles located centrally in said given layer;

means for transmitting radio signals from one locus on the earth's surface in the direction of said balloon corresponding generally to said given frequency; and means for receiving at a different locus on the earth's surface those radio signals scattered from said network.

References Cited by the Examiner

UNITED STATES PATENTS

| | | | |
|---|---|---|---|
| 2,489,337 | 11/1949 | Sperling | 343—18 |
| 2,756,948 | 7/1956 | Winzen et al. | |
| 2,881,425 | 4/1959 | Gregory | 343—18 |
| 3,151,325 | 9/1964 | Kompfner | 325—4 |
| 3,161,879 | 12/1964 | Hannan et al. | 343—18 |

DAVID G. REDINBAUGH, *Primary Examiner.*

J. W. CALDWELL, *Assistant Examiner.*